US 8,897,307 B2

United States Patent
Ram et al.

(10) Patent No.: US 8,897,307 B2
(45) Date of Patent: *Nov. 25, 2014

(54) PACKING DATA OVER AN ADAPTIVE RATE LINK

(75) Inventors: Uzi Ram, Givat Ela (IL); Dor Snapir, Tzafon (IL); Dubi Lever, Hashmonaim (IL)

(73) Assignee: Gilat Satellite Networks Ltd., Petah Tikva (IL)

( * ) Notice: Subject to any disclaimer, the term of this patent is extended or adjusted under 35 U.S.C. 154(b) by 834 days.

This patent is subject to a terminal disclaimer.

(21) Appl. No.: 13/045,983

(22) Filed: Mar. 11, 2011

(65) Prior Publication Data

US 2011/0164553 A1   Jul. 7, 2011

Related U.S. Application Data

(63) Continuation of application No. 11/838,976, filed on Aug. 15, 2007, now Pat. No. 7,929,568.

(60) Provisional application No. 60/840,041, filed on Aug. 25, 2006.

(51) Int. Cl.
*H04L 12/56* (2006.01)
*H04B 7/185* (2006.01)
*H04L 1/00* (2006.01)

(52) U.S. Cl.
CPC ............ *H04L 1/0009* (2013.01); *H04L 1/0002* (2013.01); *H04L 1/0003* (2013.01); *H04B 7/18582* (2013.01); *H04L 1/0083* (2013.01)
USPC ....................................... 370/395.4; 370/349

(58) Field of Classification Search
USPC .......................................... 370/389, 474, 473
See application file for complete search history.

(56) References Cited

U.S. PATENT DOCUMENTS 7,684,425 B2   3/2010   Thesling
7,929,568 B2 *  4/2011   Ram et al. ..................... 370/471

FOREIGN PATENT DOCUMENTS

WO        0110046      2/2001
WO     2007051079      5/2007

OTHER PUBLICATIONS

ETSI Standards, European Telecommunications Standards Institute, XP-014027139, "Digital Video Broadcasting (DVB) User Guidelines for the Second Generation System for Broadcasting, Interactive Services, News Gathering and Other Broadband Satellite Applications (DVB-S2)", vol. BC, No. V111, pp. 1-104, dated Feb. 2005.
ETSI Standards, European Telecommunications Standards Institute, XP002311764, "Digital Video Broadcasting (DVB)", No. v111, pp. 1-74, dated Jun. 2004.
European Search Report, EP07253316, dated Oct. 18, 2007.

* cited by examiner

*Primary Examiner* — Brenda H Pham
(74) *Attorney, Agent, or Firm* — Banner & Witcoff, Ltd.

(57) ABSTRACT

A system and method for packing data over User Packets and packing the User Packets over DVB-S2 Frames, using the DVB-S2-ACM satellite transmission standard.

15 Claims, 3 Drawing Sheets

PACKING DATA OVER AN ADAPTIVE RATE LINK

RELATED APPLICATIONS

This application is a continuation of non-provisional application Ser. No. 11/838,976, filed Aug. 15, 2007, and entitled "Packing Data Over An Adaptive Rate Link," the contents of which are incorporated herein by reference in its entirety for all purposes.

FIELD OF THE INVENTION

The present invention relates to improvements in use of the DVB-S2 satellite transmission protocol and in particular to packing data over an adaptive rate link.

BACKGROUND OF THE INVENTION

DVB-S2 is the second generation satellite broadcasting standard for transmitting video and data over satellite. This standard supports backward compatibility modes to DVB-S standards as well as supporting several new developments in channel coding. This improved standard supports both pre-configured constant transmission rate transmission, known as CCM, and variable and adaptive transmission modes (VCM and ACM) that support modulation and coding rate changes. The improved standard uses a train of frames where each frame can have different Modulation and Coding rates (also known as MODCODs). The frame of data packed per DVB-S2 standard, is called a BBFrame. Data packets, such as MPEGs, are placed in the BBFrame, while the BBFrame's header supplies information that enables the dis-assembly of the Data Packets at the reception. The BBFrames has variable length, spanning from 3072 to 58192 bits, depending on the code rate and on the code selected block length (two options for code block length exists, either 16200 or 64800 coded-bits long.). The BBFrames are further processed by Modulator, providing error correction encoding, adding headers and finally RF-modulating "PLFrames", referred to simply as Frames. DVB-S2 efficiency depends on the algorithm used for packing user packets, such as MPEGs, into the BBFrames, and on the algorithm of the transmission order of the Frames.

Another important issue is how to control the data sources transmit rate, so that the data sources provides a data rate that is not larger, on the average, than the actual transmission average data rate, and on the other hand, the maximal data rate capacity of the transmission can be utilized. Note that this mission is complex, because the data rate at ACM mode is not constant.

BRIEF SUMMARY OF THE INVENTION

A method and apparatus is provided for improving packing efficiency for use with, for example, the DVB-S2 protocol. In exemplary embodiments, the method and apparatus may utilize Frame ordering that increases the likelihood of a transmitted Frame's MODCOD, to be identical, or lower than previous transmitted Frame's MODCOD.

Once user data is gathered, typically the data it is placed in User Packets such as MPEG packets. The User Packets may then be placed in DVB-S2 Frames. Several User Packets may be utilized to form a Frame that can be transmitted in a matching MODCOD; however, the available data space in a frame typically does not allow packing of an integer number of User Packets without wasting data space in the frame.

Thus, it may be desirable to pack the User Packets over the DVB-S2 Frames in an efficient manner. For example, if the last User Packet in the frame cannot fit fully in the original frame that was assigned to that User Packet, it is desirable to split this last User Packet so that first part is placed near the end of the original Frame, while the remaining part is placed in, for example, the following (adjacent) Frame. However problems occur when the MODCOD of that next frame is lower than the MODCOD that was originally assigned to that User Packet, and the receiver can demodulate only the original MODCOD but not the next lower MODCOD due to C/N (carrier-noise ratio) that may be above the threshold for the original o MODCODs, but below threshold for the second-frame MODCOD. In such a case, the split User Packet will not be received at the Demodulator end. In order to minimize these events probability, it may be desirable to buffer User Packets, and than arrange the buffered User Packets into frames with transmission frame ordering from high to lower MODCOD, thus minimizing the low-to-high MODCOD transitions. This allows the User Packets (e.g., MPEGs) to start near the end of a Frame and to continue at the next Frame in most cases, except for the borders between buffering iterations. While there may be rare low-to-high MODCOD transitions which could cause some inefficiency, in general, the packing efficiency is greatly enhanced.

In further exemplary embodiments, the flow control mechanisms may adapt based on the particular type of data being distributed and the particular transmission mode selected by the system. In a typical DVB-S2 compliant data network, there are different types of data. Some data sources, such as voice applications, are time sensitive and require constant rate and short delay. By contrast, unicast IP data is not time sensitive and may use various variable and adaptive transmission modes. Unicast IP data is often subject to flow-control, where the user data source emission rate can be slowed down to match the transmission capacity. This slow down is usually done by IP protocol tools. The collected data (such as IP) is gathered and fragmented over user packets, using encapsulation methods (e.g. using standard encapsulation of IP over MPEG, by MPE standard). The next processing includes assembling user packets (e.g. MPEGs) over BBFrames. This block is referred to as Mode Adaptation. The Mode Adaptation is transferring BBFrames towards the DVB-S2 Modulator. It is highly desired to have a one-way forward interface (such as ASI) between the Mode Adaptation unit, and the Modulator. The way to accomplish this without a hazard of overflowing the Modulators input FIFOs is discussed next.

The Mode Adaptation unit includes circuits for assembling user packets into BBFrames according the data packet reception state and determines the transmission order of the Frames. In typical configurations, the Mode Adaptation block sends the BBFrames to a DVB-S2 modulator for further processing and transmission. In exemplary embodiments, the BBFrames will be stored in a memory such as a FIFO until they are read, processed (where necessary) and transmitted. While this is occurring, further back in the pipeline, new user packets are being assembled into new BBFrames in the Mode Adoption block.

Aspects of the present invention include systems and methods for including circuits in the Mode Adoption block to prevent overflow of the FIFO in the modulator. In a first exemplary embodiment, a feedback flow-control circuit provides feedback from the Modulator back to the Mode Adaptation unit. However, in some embodiments which use, for example, the ASI connection between the Mode Adaptation Unit and the Modulator unit, such a feedback mechanism requires additional non-standard physical interface.

In constant rate transmission situations, such as DVB-S or even DVB-S2-CCM, this one-way ASI connectivity is the common practice. The common solution is to cause the input data rate into the Modulator to be slightly less than the actual transmission data rate. While the Modulator insert padded data (null packets, dummy PLFrames etc) at certain points, for example, whenever its FIFO is empty. Another optional solution in a constant-rate situation is to slave a PLL in the Modulator on the fixed data rate that is entering via the ASI connector. As the transmission rate in DVB-S and in DVB-S2-CCM is constant and known, both solutions are practical and straight forward.

In still further embodiments, in a system such as ACM where the data rate is not constant, it is desired that the Mode Adaptation unit may be interfaced to the Modulator using in a one-way forward interface such as ASI. The Mode Adaptation may then be configured to transfer a queue of BBFrames for transmission to the Modulator, in a single transfer burst. A solution is desired to prevent overflowing of Modulator's input FIFO, and, on the other hand, to enable the usage of the data rate capacity as much as possible.

DETAILED DESCRIPTION OF THE INVENTION

The present invention relates to improvements in methods and apparatus which implement the DVB-S2 standard and in particular to allow pure forward interface, such as ASI, between BBFrame source (Mode Adaptation unit) and the DVB-S2 Modulator.

Improved Overflow Detection and Management System and Methods

In first aspects of the invention, a system and method is provided for building and scheduling frames into queues to more efficiently detect and manage overflow conditions. In exemplary embodiments, certain amount of user data is collected, and BBFrames are assembled, and put into a predetermined transmission order. They may then be transferred rapidly to Modulator, for further processing and final transmission. The amount of ordered-BBFrames that are transferred is designed to be less than the FIFO space in the Modulator. Now the next time that a burst of ordered-BBFrames is transferred towards the Modulator will be held-back, for a time lasting slightly more than the time that is required to transmit the previous burst of ordered-frames. Note that the time of transmission of specific ordered-frames can be computed by the Mode Adaptation, as the MODCOD of each Frame is known, and the transmission symbol rate is also known to the Mode Adaptation unit. This hold-back allows the Modulator's FIFO to empty just before they are re-loaded by more frames. The Mode Adaptation will need to hold FIFOs for the user data packets, and perform flow control depending on its FIFOs state, using, for instance, IP protocol to slow-down data sources, if required.

Figure 1:
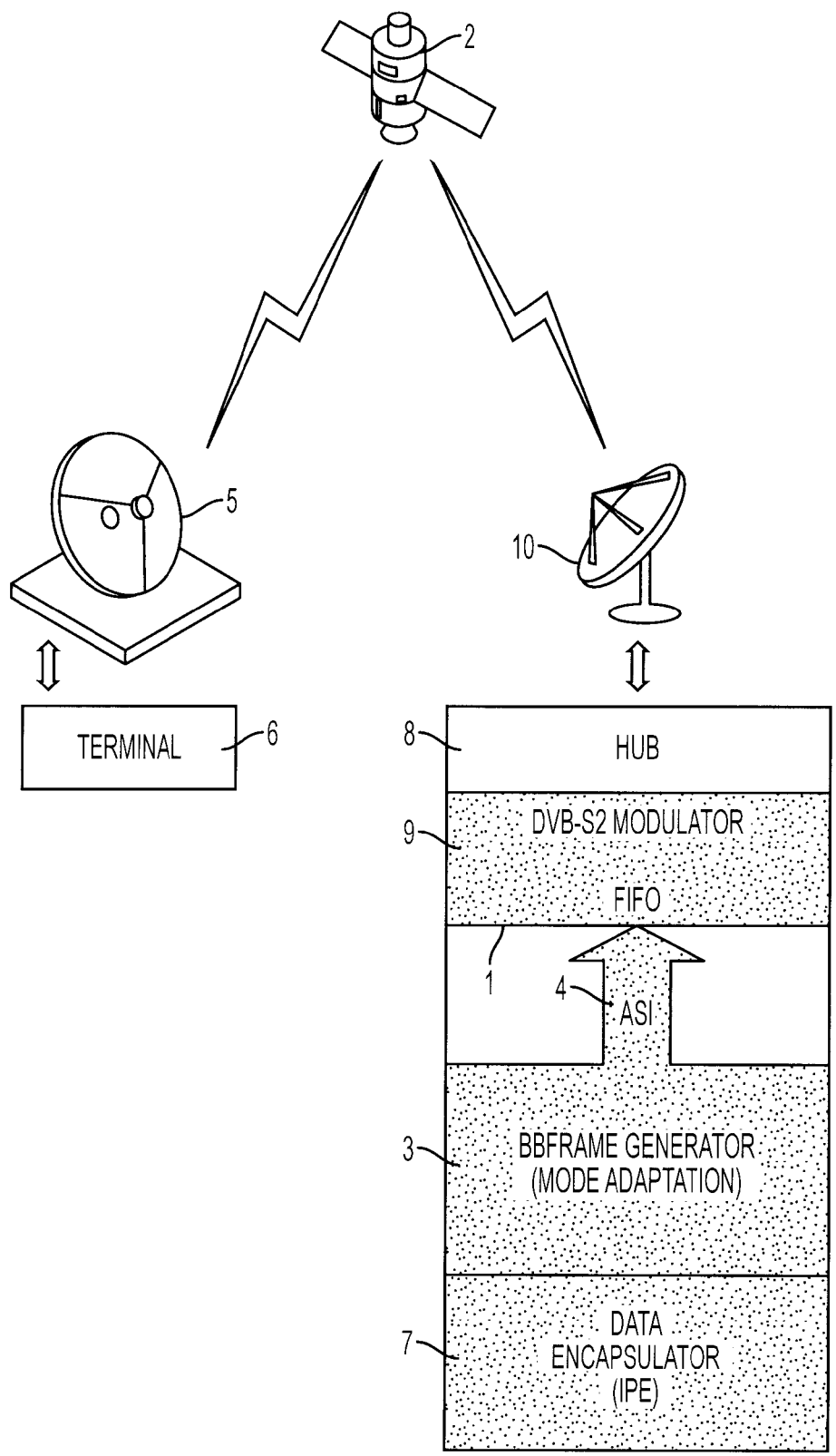
FIG. 1 shows an exemplary satellite buffering employing an adaptive coding scheme in accordance with aspects of the invention.

With reference to FIG. 1, the flow management system of the present invention is shown. In this embodiment, circuits are included for collecting data and encapsulating them by IPE 7, further processing the user packets into an ordered stream of BBFrames by the Mode Adaptation unit (3), and circuits for sending ordered BBFrames via one-way interface such as ASI (4) towards DVB-S2 Modulator (9). The Modulator first stores the BBFrames in his input buffer FIFO (1). To prevent over-flowing the Modulator's FIFO, the ordered-BBFrame transfer is held-back for a time that is calculated by the Mode Adaptation logic, to be slightly longer than the transmission time of the previous transfer of ordered-BBFrames. The Modulator than encodes, modulates and transmit the DVB-S2 frames towards Satellite (2) via Hub dish (10). The DVB-S2 may be received by VSAT Terminals, one of such terminals is shown (5).

Improved Frame Packing System and Methods

In still further aspects of the invention, the efficiency of the overall DVB-S2 transmission protocol may be improved by modifying the buffer and transmission BBFrame ordering to increase efficiencies. For example, with reference to FIGS. 2 and 3, where the buffer and transmission BBFrame ordering is from higher-to-lower MODCODs for a relatively large amount of consecutive ordered-frames, with only a single possible low-to-high MODCOD transmission between different ordered frame groups. This allows minimizing lower-to-higher MODCOD transitions. The buffer and transmission frame ordering may be configured to allow User Packets (i.e. MPEGs) to start near the end of a BBFrame, and almost always continue to the next BBFrame, as long as the next Frame is of the same or lower MODCOD value, thus increasing packing efficiency.

In exemplary embodiments, the MODCOD scheduler within the Mode Adaptation block, maintains the "traffic type" (e.g. Real Time and Non Real Time, denoted by RT, and NRT) handling by prioritizing traffic and controlling jitter and delay for each type of traffic. In these embodiments, the MODCOD scheduler may signal the IP layer when flow-control is needed. The MODCOD scheduler may also be configured to give priority to RT data over NRT data, and to discard RT packets if necessary, to limit RT buffering delay (e.g. when RT-Data buffers overflow)

User Packets may be formed based on data type. Further, the User Packets may be configured such that the destination may be determined. In these instances, it may be desirable for the ACM scheduler machine to use information on the instantaneous C/N condition at the destination to assign the appropriate MODCOD to the User Packets. The User Packets may be placed over the Frames based on the data type and MODCOD assignment. Thus a User Packet having an assigned MODCOD of 3 would be assigned to a Frame having a MODCOD of 3.

Figure 4:
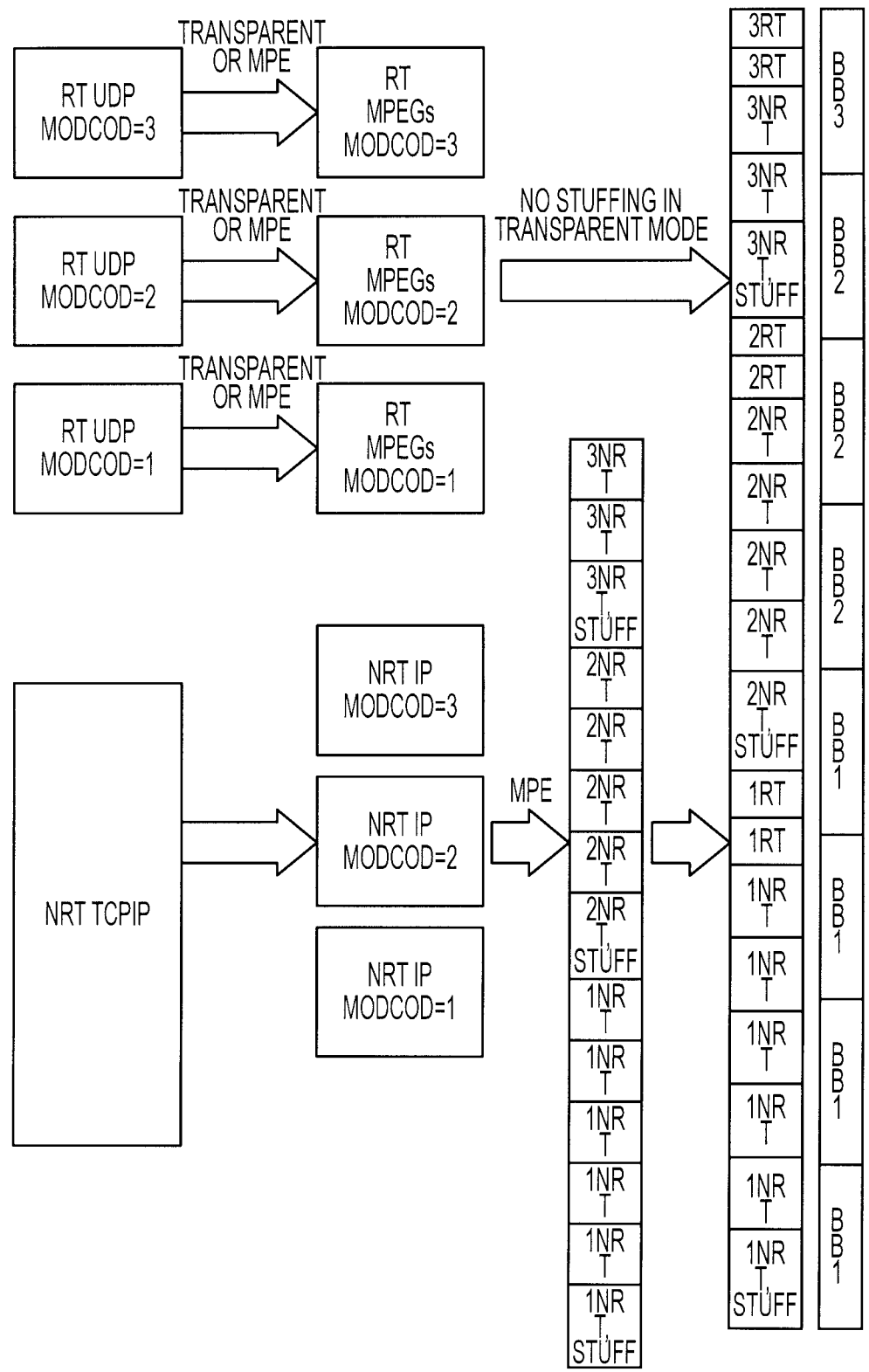
FIG. 4 shows a queue of BBFrames utilizing high-to-lower MODCOD transitions in accordance with further aspects of the invention.

Attention is drawn to FIG. 4. The Frames in this example are arranged in a descending MODCOD order, e.g., BB3, BB2, BB2, BB2, BB1, BB1, BB1, BB1. The MODCODs are placed in the frames based in order of traffic-types in the same MODCOD, than by descending MODCODs. For example, 3RT, 3RT, 3NRT are fully placed in BB3. 3NRT is then split between BB3 and the next frame. The next frame is determined by the queue. As shown in FIG. 4, the next frame will contain the remaining portion of 3NRT, 3NRTStuff, 2RT, and a portion of 2RT. Since the lowest number of MODCOD is now 2, a lower number (more robust) Frame is used—BB2. The next two frames are BB2 as they contain only 2RT and 2NRT MODCODs. The fifth frame contains a portion of the 2NRTstuff and then 1RT MODCODs. Since the lowest number of MODCOD for a User Packet is now 1, a lower number (more robust) Frame is used—BB1. This drawing corresponds to a single transfer iteration of an ordered-frame-queue, towards the Modulator.

If this policy is kept and the queue of frames is arranged for transmission iterations as in this example, almost all the Frame transmissions will involve the same MODCOD, or a descending MODCOD. Only the transition of the last frame to the first frame of next iteration involves a frame transmission with increased MODCOD.

Only at that last lowest MODCOD number frame, a whole unit (integer) of User Packets must be assembled and the tail of that last frame will be filled with padding.

Figure 2:
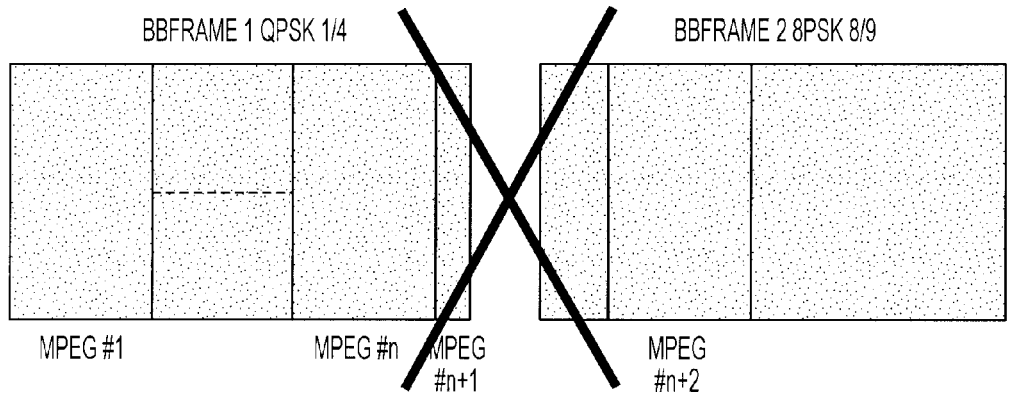
FIG. 2 shows an inefficient BBFrame frame ordering from low-to-higher MODCOD transition.

In order to guaranty successful reception, data that is assigned to be sent by a specific MODCOD may be sent using that MODCOD or a lower (more protected) MODCOD. For example, as shown in the example illustrated in FIG. 3, 8PSK 8/9 data may be sent using a QPSK ¼ BBFrame, but QPSK ¼ data cannot be sent using an 8PSK 8/9 BBFrame (FIG. 2).

Figure 3:
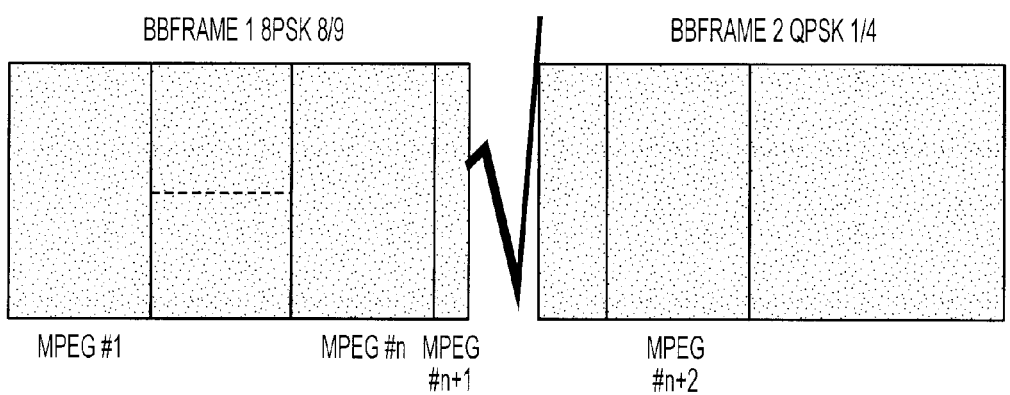
FIG. 3 shows a high-to-lower MODCOD transition in accordance with aspects of the invention.

In the Example shown in FIG. 3, MPEG-type user packet may be "broken" between two adjacent (in the transmission queue) Frames as long as the next Frame is of equal or lower (more protected) MODCOD. However, a complete MPEG typically needs to end in a Frame, if the next Frame is of a higher (less protected) MODCOD. That means that no fractional MPEG-cut should be allowed in the last Frame of an ordered-frame transfer iteration.

A global control may be used to force "Integer MPEGs per BBFrame packing" This optional control may be desired for compatibility with different receivers.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

The invention claimed is:

1. A MODCOD scheduler circuit configured to form and transmit a queue of frames, the scheduler comprising:
    one or more circuits configured to prepare user packets of data for transmission by assigning an appropriate MODCOD for each user packet based on destination terminal reception condition and data type;
    one or more circuits configured to arrange a frame transmission order as a descending order of MODCODs;
    one or more circuits configured to allow a last frame of a certain MODCOD that is partially filled with user packets to be replaced by a frame with a lower MODCOD containing said user packets together with additional user packets that were assigned to the lower MODCOD; and
    one or more circuits configured to pack user packets into frames corresponding to the assigned MODCOD of each user packet, and
    wherein said MODCOD scheduler circuit is configured to allow user packets to be split between adjacent frames in the queue of frames for transmission, but is configured not to allow said user packets to be split between a last frame of one queue and a first frame of a next queue.

2. The MODCOD scheduler circuit of claim 1, wherein if a frame cannot be fully filled with user packets corresponding to its assigned MODCOD, the MODCOD scheduler circuit is configured to select a frame corresponding to a lower MODCOD for said user packets and for additional user packets that correspond to said lower MODCOD, but wherein said MODCOD scheduler circuit is configured to transmit a partially-filled originally-assigned MODCOD if the frame corresponding to lower MODCOD does not contain enough data space to hold said user packets.

3. The MODCOD scheduler circuit of claim 1, wherein the circuit is configured to pack the frames until the last frame in the queue of frames is packed, wherein the last user packet in the last frame is a complete user packet.

4. The MODCOD scheduler circuit of claim 3, wherein the circuit is configured to pack any remaining portion of said last frame with padding.

5. The MODCOD scheduler circuit of claim 1, wherein the user packets are MPEGs.

6. The MODCOD scheduler circuit of claim 1, further comprising a BBFrame generator comprising a mode adaptation sub-system, said BBFrame generator configured to calculate the time of transmission of the queue of frames based on the MODCODs of each frame and a baud rate.

7. The MODCOD scheduler circuit of claim 6, wherein the mode adaptation sub-system is configured to initiate a hold of a further transmission of a next queue of frames for a time that is slightly longer than the time needed to transmit a previous queue of frames.

8. The MODCOD scheduler circuit of claim 1, further comprising:
    one or more circuits configured to calculate a time of transmission of the queue of frames based on MODCODs of each frame and a baud rate, and further configured to hold back further transmission of a next queue of frames in accordance with the calculated time.

9. A method of reducing MODCOD transitions, comprising:
    scheduling a queue of frames for transmission;
    collecting a plurality of user packets of data for transmission;
    building frames from said plurality of user packets based on MODCOD attributes of the user packets; and
    setting a frame queue for transmission in an equal or descending order of MODCOD,
    wherein if a frame cannot be fully filled with user packets of a higher MODCOD attribute, a frame with lower MODCOD is selected to contain these user packets and additional user packets with attributes equal to said lower MODCOD.

10. The method of claim 9, further comprising:
    determining if a last user packet in a frame can completely fit into said frame; and
    if the last user packet in the frame cannot completely fit into said frame, splitting said last user packet between adjacent frames in the queue of frames.

11. The method of claim 9, further comprising packing the frames until the last frame in the queue of frames is packed, wherein the last user packet in the last frame is a complete user packet.

12. The method of claim 11, further comprising packing any remaining portion of a last frame with padding.

13. The method of claim 9, wherein the user packets are MPEGs.

14. The method of claim 9, further comprising calculating the time of transmission of the queue of frames based on the MODCODs of each frame and a baud rate.

15. The method of claim 9, further comprising:
    calculating a time of transmission of the queue of frames based on MODCODs of each frame and a baud rate; and holding back further transmission of a next queue of frames in accordance with the calculated time.

* * * * *